(12) United States Patent
Friedler et al.

(10) Patent No.: US 9,569,345 B2
(45) Date of Patent: Feb. 14, 2017

(54) ARCHITECTURAL FAILURE ANALYSIS

(71) Applicant: International Business Machines Corporation, Armonk, NY (US)

(72) Inventors: Ophir Friedler, Haifa (IL); Wisam Kadry, Haifa (IL); Amir Nahir, Megadim (IL); Vitali Sokhin, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 162 days.

(21) Appl. No.: 14/141,981

(22) Filed: Dec. 27, 2013

(65) Prior Publication Data

US 2015/0186250 A1    Jul. 2, 2015

(51) Int. Cl.
G06F 9/44 (2006.01)
G06F 11/36 (2006.01)
G06F 11/22 (2006.01)

(52) U.S. Cl.
CPC .......... *G06F 11/3688* (2013.01); *G06F 11/22* (2013.01); *G06F 11/3692* (2013.01)

(58) Field of Classification Search
CPC .................................................. G06F 11/3672
See application file for complete search history.

(56) References Cited

U.S. PATENT DOCUMENTS

| | | |
|---|---|---|
| 6,496,792 B1 | 12/2002 | Magnusson |
| 6,790,680 B1 * | 9/2004 | Grover et al. .................. 438/5 |
| 7,373,619 B2 | 5/2008 | Johnson |
| 7,483,824 B1 | 1/2009 | Hill |
| 7,895,029 B2 | 2/2011 | King et al. |
| 8,069,325 B2 | 11/2011 | Vermeulen et al. |
| 8,732,676 B1 | 5/2014 | Kolawa et al. |
| 8,892,951 B2 * | 11/2014 | Chandra et al. ............. 714/38.1 |
| 2008/0163186 A1 | 7/2008 | Devarajan et al. |
| 2011/0087861 A1 | 4/2011 | Bertacco et al. |
| 2012/0084538 A1 | 4/2012 | Alapati et al. |
| 2012/0254827 A1 * | 10/2012 | Conrad et al. ................ 717/104 |
| 2012/0324208 A1 | 12/2012 | Alapati et al. |

(Continued)

FOREIGN PATENT DOCUMENTS

EP    1870829 A1    12/2007
WO    2012087894 A2    6/2012

OTHER PUBLICATIONS

ACM digital library page, http://dl.acm.org/citation.cfm?id=2617064, retrieved May 25, 2016.*

(Continued)

*Primary Examiner* — Philip Wang
(74) *Attorney, Agent, or Firm* — David B. Woycechowsky

(57) ABSTRACT

Localizing errors by: (i) running the testcase on a software model version of a processor to yield first testcase-run results in the form of a first set of values respectively stored in the set of data storage locations; (ii) creating a resource dependency information set based on the instructions of the testcase; (iii) running the testcase on a hardware version of the processor to yield second testcase-run results in the form of a second set of values respectively stored in the set of data storage locations; (iv) determining a set of miscompare data storage location(s), including at least a first miscompare data storage location, by comparing the first set of values and the second set of values; and (v) creating an initial dynamic slice of the data flow.

20 Claims, 11 Drawing Sheets

(56) References Cited

U.S. PATENT DOCUMENTS

| | | | |
|---|---|---|---|
| 2013/0013246 A1 | 1/2013 | Adir et al. | |
| 2014/0019806 A1* | 1/2014 | Kahne | 714/33 |
| 2014/0032969 A1* | 1/2014 | Landa et al. | 714/33 |
| 2014/0053134 A1* | 2/2014 | Wiggers et al. | 717/124 |

OTHER PUBLICATIONS

IEEE, DAC 2013 page, http://www.ieee.org/conferences_events/conferences/conferencedetails/index.htm?Conf_ID=18792, retrieved May 25, 2016.*

Balston et al., "Emulation in Post-Silicon Validation: It's Not Just for Functionality Anymore", Published in 2012 IEEE International High Level Design Validation and Test Workshop (HLDVT), pp. 110-117, Copyright 2012 IEEE.

Balston et al., "Post-Silicon Code Coverage for Multiprocessor System-on-Chip Designs", IEEE Transactions on Computers, vol. 62, No. 2, Feb. 2013, pp. 242-246.

Friedler et al., "Post-Silicon Debugging of Transactional Memory Tests", IBM Research, Center for Informatics and Information Technologies, WTM'13 Prague, Apr. 14, 2013, pp. 1-10, Grace Period Disclosure.

Lin et al., Quick Detection of Difficult Bugs for Effective Post-Silicon Validation, DAC'12 Jun. 3-7, 2012, San Francisco, CA, USA., Copyright 2012 ACM 978-1-4503-1199—Jan. 12, 2006, pp. 561-566.

Nahir et al., "Bridging Pre-Silicon Verification and Post-Sllicon Validation" Copyright is held by the author/owner(s), DAC'10, Jun. 13-18, 2010, Anaheim, California, USA, pp. 94-95, ACM 978-1-4503-0002—May 10, 2006.

Nahir et al., "Optimizing Test-Generation to the Execution Platform", 2012 17th Asia and South Pacific Design Automation Conference (ASP-DAC), Jan. 30, 2012-Feb. 2, 2012, pp. 304-309.

Park et al., "IFRA: Instruction Footprint Recording and Analysis for Post-Silicon Bug Localization in Processors", DAC'2008, Jun. 8-13, 2008, Anaheim, California, USA, pp. 373-378.

"Effective Post-Silicon Failure Localization Using Dynamic Slicing", DAC'13, Austin, TX, USA, Copyright 2013 ACM.

Bojan et al., "Functional Coverage Measurements and Results in Post-Silicon Validation of Core TM2 Duo Family", pp. 145-150, Copyright 2007 IEEE.

Chang et al., "Automating Post-Silicon Debugging and Repair", IEEE/ACM International Conference on Computer-Aided Design, Nov. 4-8, 2007, ICCAD 2007, © 2007 IEEE, pp. 91-98.

Sadasivam et al., "Test Generation Approach for Post-Silicon Validation of High End Microprocessor", 2012 15th Euromicro Conference on Digital System Design, pp. 830-836, Copyright 2012 IEEE, © 2012 IEEE DOI 10.1109/DSD.2012.148.

Yang et al., "Automated Data Analysis Solutions to Silicon Debug", 978-3-9810801-5-5/DATE09 © 2009 EDAA.

U.S. Appl. No. 14/141,845 entitled "Efficient Debugging of Memory Miscompare Failures in Post-Silicon Validation", filed Dec. 27, 2013.

Friedler et al., "Effective Post-Silicon Failure Localization Using Dynamic Slicing", Proceedings of the conference on Design, Automation & Test in Europe Article No. 319, Date '14, 978-3-9815370-2-4/DATE14/ © 2014 EDAA, 6 pages.

* cited by examiner

800a

|  | R0 | R1 | R2 | R3 | 0xB |
|---|---|---|---|---|---|
| INITIAL STATE | 0 | C | A | F | E |

I1: R0 <- R1 + R2

I2: R2 <- R0 + 5

I3: R3 <- 0 x B

I4: M(R3) <- R2

I5: R2 <- R1 - 1

| CORRECT FINAL STATE | 3 | C | 0 | B | 8 |
|---|---|---|---|---|---|
| CORRUPTED FINAL STATE | 3 | C | 0 | B | 13 |

FIG. 8A

ARCHITECTURAL FAILURE ANALYSIS

STATEMENT REGARDING PRIOR DISCLOSURES BY THE INVENTOR OR A JOINT INVENTOR

The following disclosure(s) are submitted under 35 U.S.C. section 102(b) (1)(A): DISCLOSURES: Presentation entitled, "Post-Silicon Debugging Of Transactional Memory Tests", made at the Workshop On Transactional Memory in Prague on Apr. 14, 2013 including ten (10) presentation slides and associated inventor talking points.

FIELD OF THE INVENTION

The present invention relates generally to the field of analyzing failures in circuitry hardware, such as, silicon based circuitry hardware.

BACKGROUND OF THE INVENTION

In order to find hardware and/or software problems it is known to run "testcases" on one or both of the following: (i) a software model version of a processor (also called pre-silicon); and/or (ii) a hardware version of the processor (also called "post-silicon").

Architectural localization is the first step in debugging a post-silicon fail. Architectural localization is aimed at locating the instructions in a testcase where incorrect DUT (design under test) behavior has propagated to the architectural level. Data is gathered in the architectural localization phase, such as the identity of the suspicious instructions, the location of these instructions in memory, and the operands they access, etc. Based on the gathered data, the DUT's hardware debug logic can then be configured to trace specific signals facilitating the "root-causing" of the incorrect behavior (also referred to as a "bug").

SUMMARY

According to an aspect of the present invention, there is a method, system and/or computer program product for helping to localize an error observed by running a testcase made up of instructions that write to a set of data storage locations. The following actions are performed (not necessarily in the following order): (i) running the testcase on a software model version of a processor to yield first testcase-run results in the form of a first set of values respectively stored in the set of data storage locations; (ii) creating a resource dependency information set based on the instructions of the testcase; (iii) running the testcase on a hardware version of the processor to yield second testcase-run results in the form of a second set of values respectively stored in the set of data storage locations; (iv) determining a set of miscompare data storage location(s), including at least a first miscompare data storage location, by comparing the first set of values and the second set of values; and (v) creating an initial dynamic slice of the data flow based upon: (a) the set of miscompare data storage location(s), and (b) the resource dependency information set.

BRIEF DESCRIPTION OF THE SEVERAL VIEWS OF THE DRAWINGS

FIGS. 8A, 8B 8C and 8D respectively show four data flow diagrams helpful in explaining the present invention.

DETAILED DESCRIPTION

Figure 1:
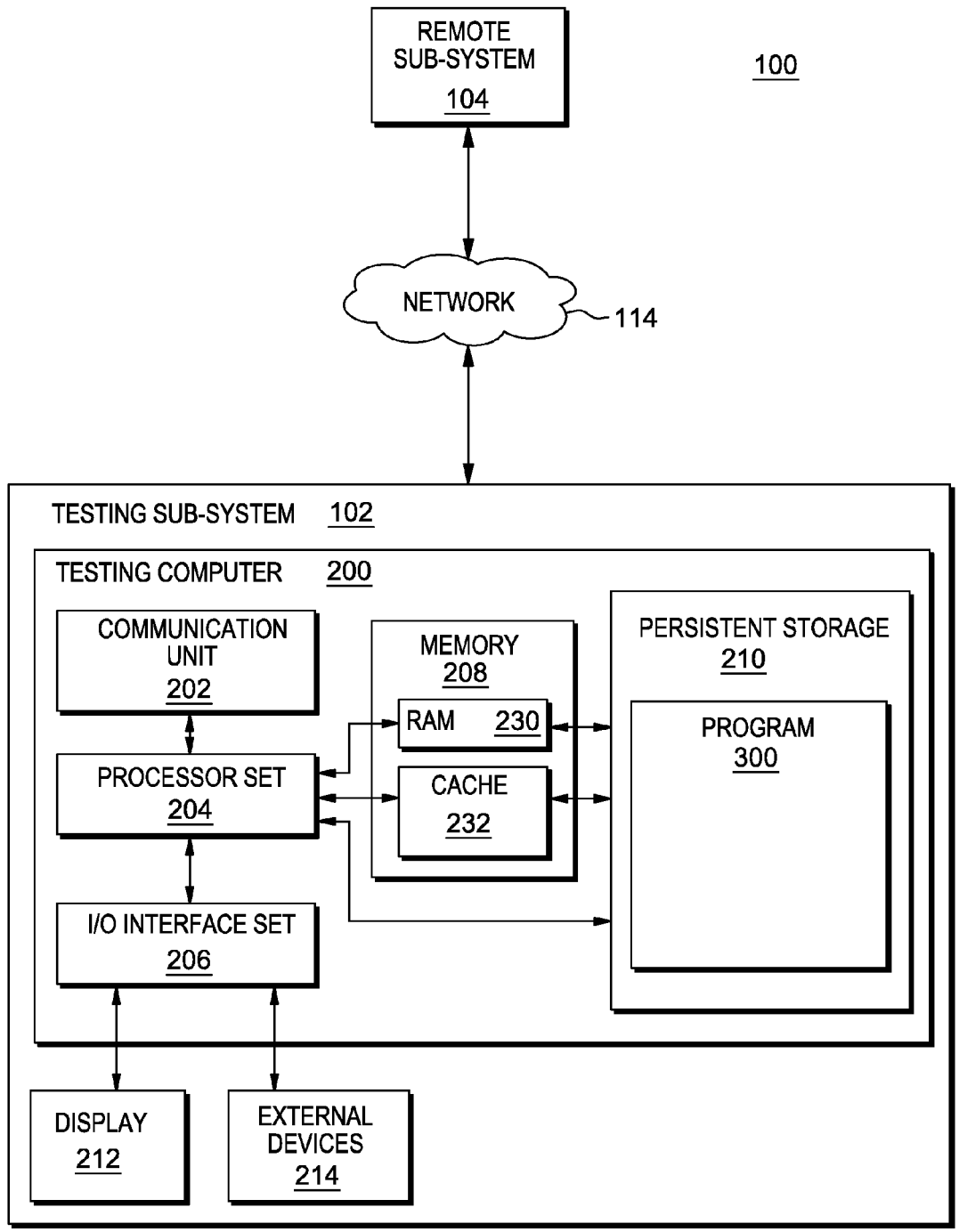
FIG. 1 is a schematic view of a first embodiment of a networked computers system which is an embodiment of an environment suitable for implementing the present invention.

Some embodiments of the present invention use Instruction Set Simulation (also called ISS, or golden reference model) as a vehicle to explore fail reasons and obtain observability into the architectural changes triggered by the failing test-case. Some methods according to the present invention re-run a failing testcase on the ISS. By running the testcase on the ISS, machine logic (for example, software) can determine, for every architectural resource, whether the value it had at the end of the execution of the testcase on the DUT was correct or faulty. In some embodiments of the present invention, all architectural resources are divided into two sets as follows: (i) correct resources; and (ii) faulty resources. In addition, based on the intermediary architectural values (as observed on the ISS), machine logic is used to construct a dependency graph describing the changes to these resources throughout the execution of the testcase and their dependency on one another.

Some embodiments leverage dynamic slicing techniques and based on the set of faulty resources, traverse the dependency graph to find a subset of the testcase instructions that affect these resources. This subset of the testcase is here referred to as the program slice. Because the ISS models the dependencies between resources as they are created by the instruction, the program slice is guaranteed to hold the instruction that the DUT failed to execute. The program slice includes all the instructions in the test-case that affected the faulty resources. However, these instructions may also affect additional resources.

Some embodiments of the present invention use a heuristic that, based on the identity of the correct resources, removes some suspicions instructions from the program slice. This heuristic relies on a simple rule as follows: if an instruction affects some resource that holds a correct value at the end of the test-case, then the instruction must have been executed successfully. Therefore, this heuristic will remove such an instruction from the suspicions instructions list.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including machine languages, such as ARM ISA (instruction set architecture), object oriented programming languages, such as Java (note: the term(s) "Java" and/or "ARM" may be subject to trademark rights in various jurisdictions throughout the world and are used here only in reference to the products or services properly denominated by the marks to the extent that such trademark rights may exist), Smalltalk, C++ or the like and conventional procedural programming languages, such as the "C" programming language. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

An embodiment of a possible hardware and software environment for software and/or methods according to the present invention will now be described in detail with reference to the Figures. FIG. 1 is a functional block diagram illustrating various portions of distributed data processing system 100, including: testing sub-system 102; remote sub-system 104; and communication network 114. Sub-system 102 includes: testing computer 200, which includes: communication unit 202; processor set 204; input/output (i/o) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the device on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102, such as remote sub-system 104. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 240, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

II. Example Embodiment

Preliminary note: The flowchart and block diagrams in the following Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
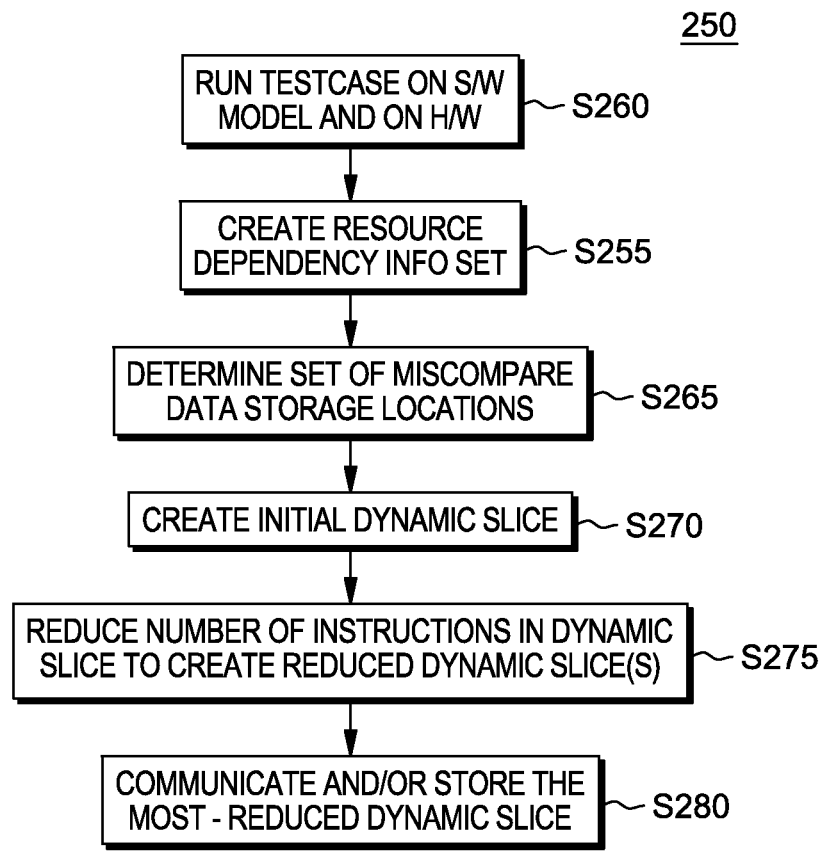
FIG. 2 is a flowchart showing a first example method according to the present invention.
Figure 3:
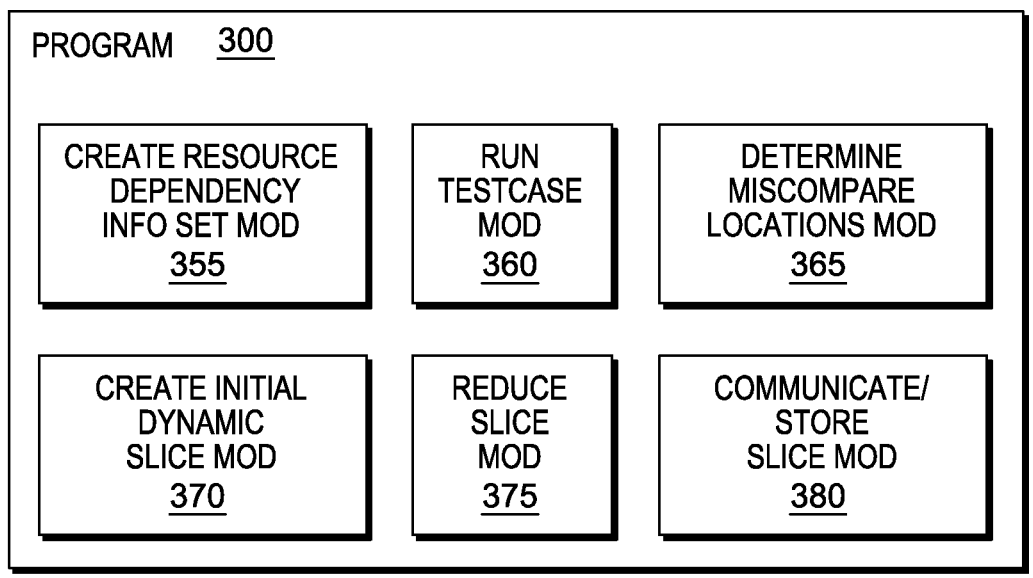
FIG. 3 is a schematic view of a first embodiment of software according to the present invention.

FIG. 2 shows a flow chart 250 depicting a method according to the present invention. FIG. 3 shows program 300 for performing at least some of the method steps of flow chart 250. This method and associated software will now be discussed, over the course of the following paragraphs, with extensive reference to FIG. 2 (for the method step blocks) and FIG. 3 (for the software blocks).

Processing begins at step S260, where run testcase module ("mod") 360 runs a testcase on: (i) a software model of a processor; and (ii) a hardware version of the processor. This running of a testcase on "soft" and "hard" versions of a processor is conventional. In this example, the following results are obtained by running the testcase: (i) software L1=1; (ii) hardware L1=1; (iii) software L2=2; (iv) hardware L2=2; (v) software L3=3; (vi) hardware L3=8; (vii) software L4=4; and (ix) hardware L4=9.

Processing proceeds to step S255, where create resource dependency info module ("mod") 355 of program 300 creates a resource dependency information set based on instructions in a testcase. In this example, the resource dependency information set is in the form of a table. Alternatively, the resource dependency information set could be in other forms, such as a graph, or as a file of machine readable information.

Figure 4:
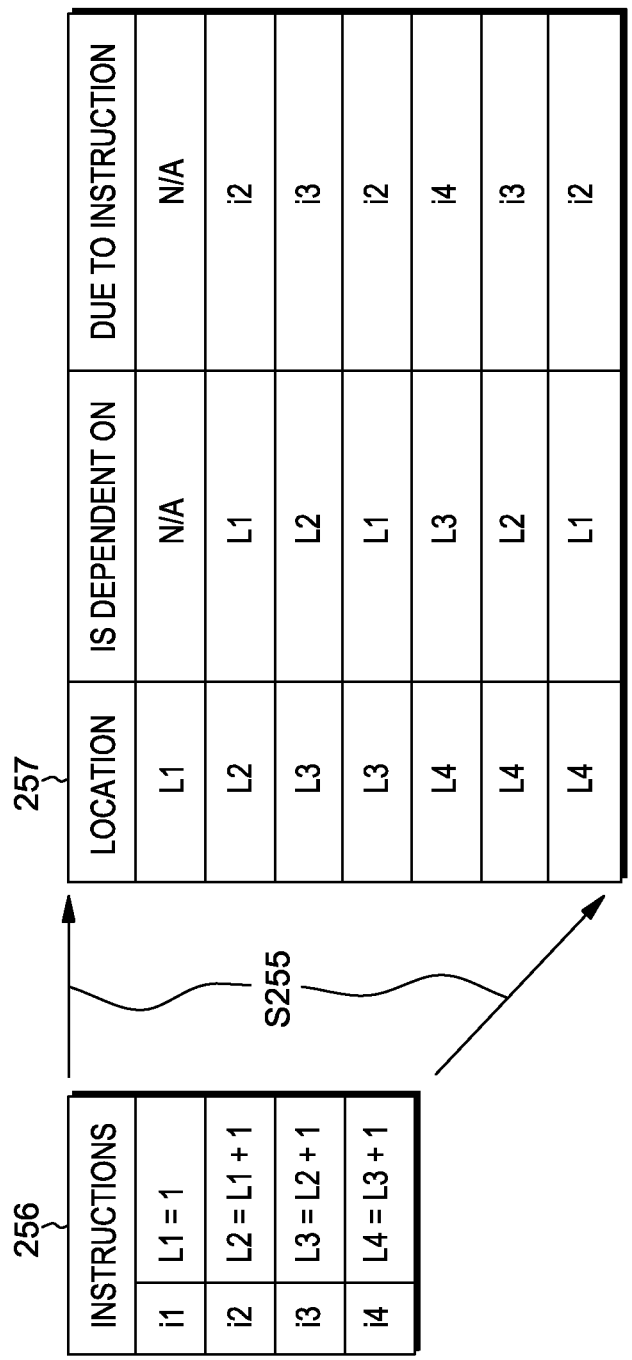
FIG. 4 is diagram showing operations according to an example of the present invention.

FIG. 4 shows how resource dependency information table 257 is created based on testcase instruction set 256. In FIG. 4: (i) i1, i2, i3 and i4 are the instructions of a very simple testcase; and (ii) L1, L2, L3 and L4 are data storage locations that are present in the instructions of the testcase. As shown in table 257, data storage location L1 is not dependent upon any other data storage location. As further shown in table 257, data storage location depends upon only one other data storage location, specifically L1, and so on.

Processing proceeds to step S265, where determine miscompare locations mod 365 compares the testcase run values as between corresponding, respective software locations L1 to L4 and hardware locations L1 to L4. In this simple example, the miscompare values are L3 and L4 because the hardware version has, for some reason, obtained incorrect values (specifically L3=8 and L4=9) at these two data storage locations.

Processing proceeds to step S270, where create initial dynamic slice mod 370 creates an initial dynamic slice. A dynamic slice is a subset of instructions of the testcase. In this simple example, the initial dynamic slice will therefore be a subset of instructions i1 to i4. This initial dynamic slice is created by checking resource dependency information table 257 to see which instructions the miscompare values are dependent upon. In this example, miscompare locations L3 and L4 are collectively based upon i2, i3 and i4. This means that the initial dynamic slice is i2, i3 and i4. In this example, the creation of the initial dynamic slice has eliminated instruction i1 from consideration as the instruction that "seeded" the incorrect values in the hardware data storage locations (or, as one of multiple instructions that "seeded" incorrect values in the hardware data storage locations). This is helpful to localize the error in the data flow caused by running of the testcase.

Processing proceeds to step S275 where reduce slice mod 375 reduces, or at least tries to reduce, the number of testcase instructions in the dynamic slice for each correct (that is, non-miscompare) value as between the hardware and software testcase run results. In this example, L1 is a non-miscompare location, so any instructions that write locations upon which L1 is dependent can be eliminated from the initial dynamic slice to create a first reduced dynamic slice. Unfortunately, as shown in table 257 of FIG. 4, L1 is not dependent upon any other locations, meaning that no corresponding instructions can be eliminated from the initial dynamic slice. However, moving along to non-miscompare location L2, table 257 shows that this location is dependent upon instruction i2, meaning that instruction i2 can be eliminated from the initial dynamic slice to create a first reduce dynamic slice having only instructions i3 and i4. This reduction of the dynamic slice is also helpful to localize the error in the data flow caused by running of the testcase.

Processing proceeds to step S280, where communicate/store slice mod 380 of program 300 communicates and stores the most reduced dynamic slice for use by people and/or diagnostic software in studying the miscompare problem. For example, human workers may further localize the cause of the miscompare to a single instruction and/or single data storage location, but their efforts are reduced because the reduced dynamic slice reduces the amount of instructions that need to be considered as potentially problematic. In this example, at step S280, the first reduced dynamic slice is: (i) stored as a file at persistent storage 210 (see FIG. 1); and (ii) sent by email, through network 114, to remote sub-system 104.

III. Further Comments and/or Embodiments

Some embodiments of the present disclosure are directed to a method that helps in localizing architectural level failures in circuitry being tested by a multi-pass exerciser. The failing testcase is executed on a reference model to build a dynamic slice which facilitates the localization of the instruction in the testcase that caused the error.

Some embodiments of the present disclosure may have one, or more, of the following characteristics, features and/or advantages: (i) use of a software reference model (sometime called golden model) as a vehicle to explore fail reasons and obtain observability into the architectural changes triggered by the testcase; (ii) software initializes and re-runs the failing testcase on the reference model, based on a report extracted from data obtained from an exerciser fail; (iii) utilization of dynamic slicing techniques to determine the list of instructions that affect the miscomparing resources at the end of the test based on a resource dependency graph constructed from the data collected during the reference model's run; and/or (iv) a dependency graph that enables us to filter out of this instruction list a small subset of instructions that have high likelihood of triggering the miscompare.

Some embodiments of the present disclosure use the software reference model as a vehicle to explore fail reasons and obtain observability into the architectural changes of resources, both registers and memory, triggered by the execution of the testcase.

Some embodiments of the present disclosure use a two-stage approach to bug localization. In the first stage, using a novel heuristic, wrong execution paths are evaluated in an attempt to provide an accurate justification to the end-of-test erroneous results, as will be discussed in more detail, below. If this first stage approach fails to provide an explanation, then the method proceeds to the second stage where dynamic slicing techniques are leveraged to analyze dependencies between the various resources and identify instructions that affect the miscomparing ones as will be further discussed below.

Figure 5A:
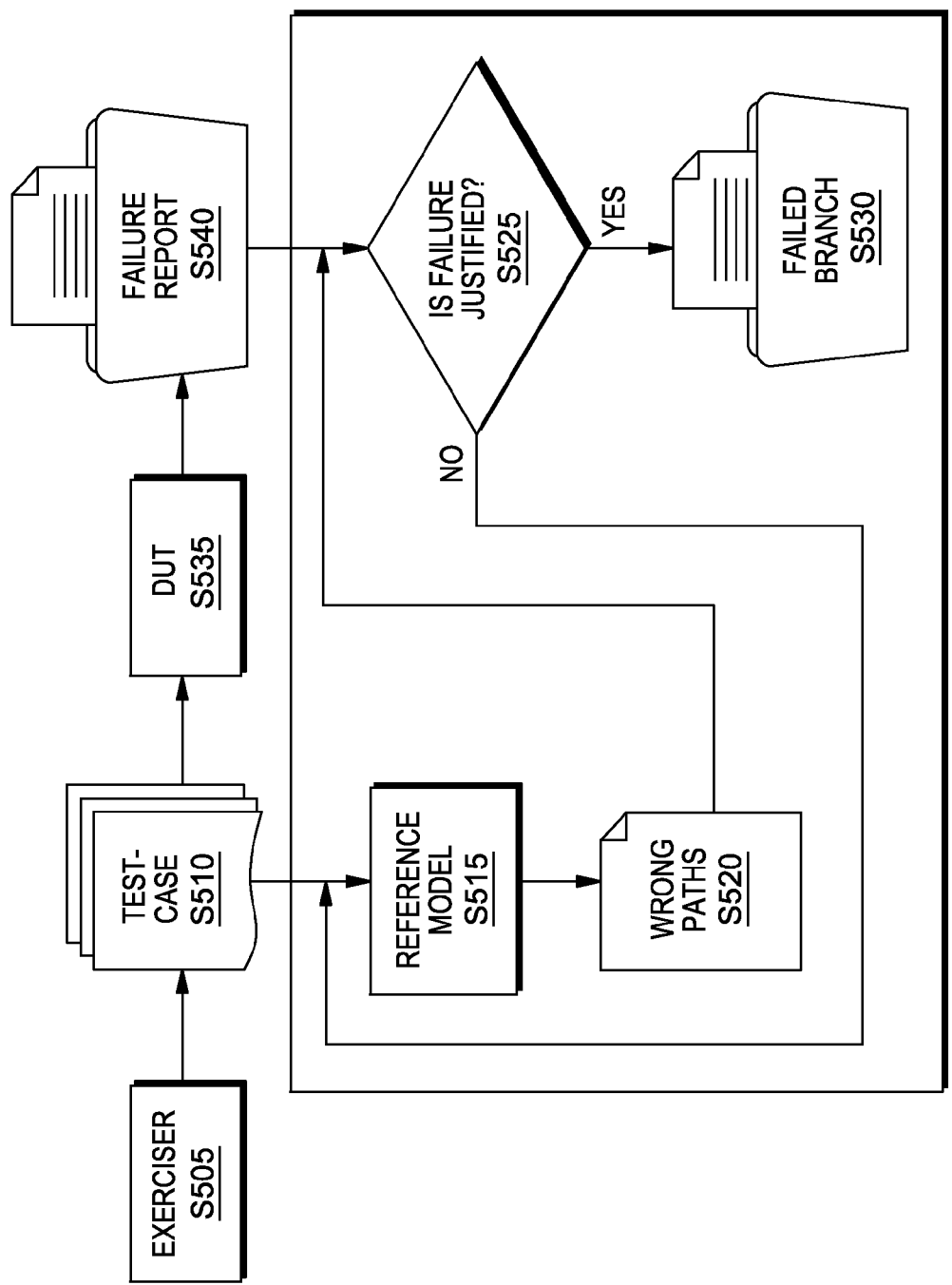
FIG. 5A is a process flow diagram showing a second example method according to the present invention.
Figure 5B:
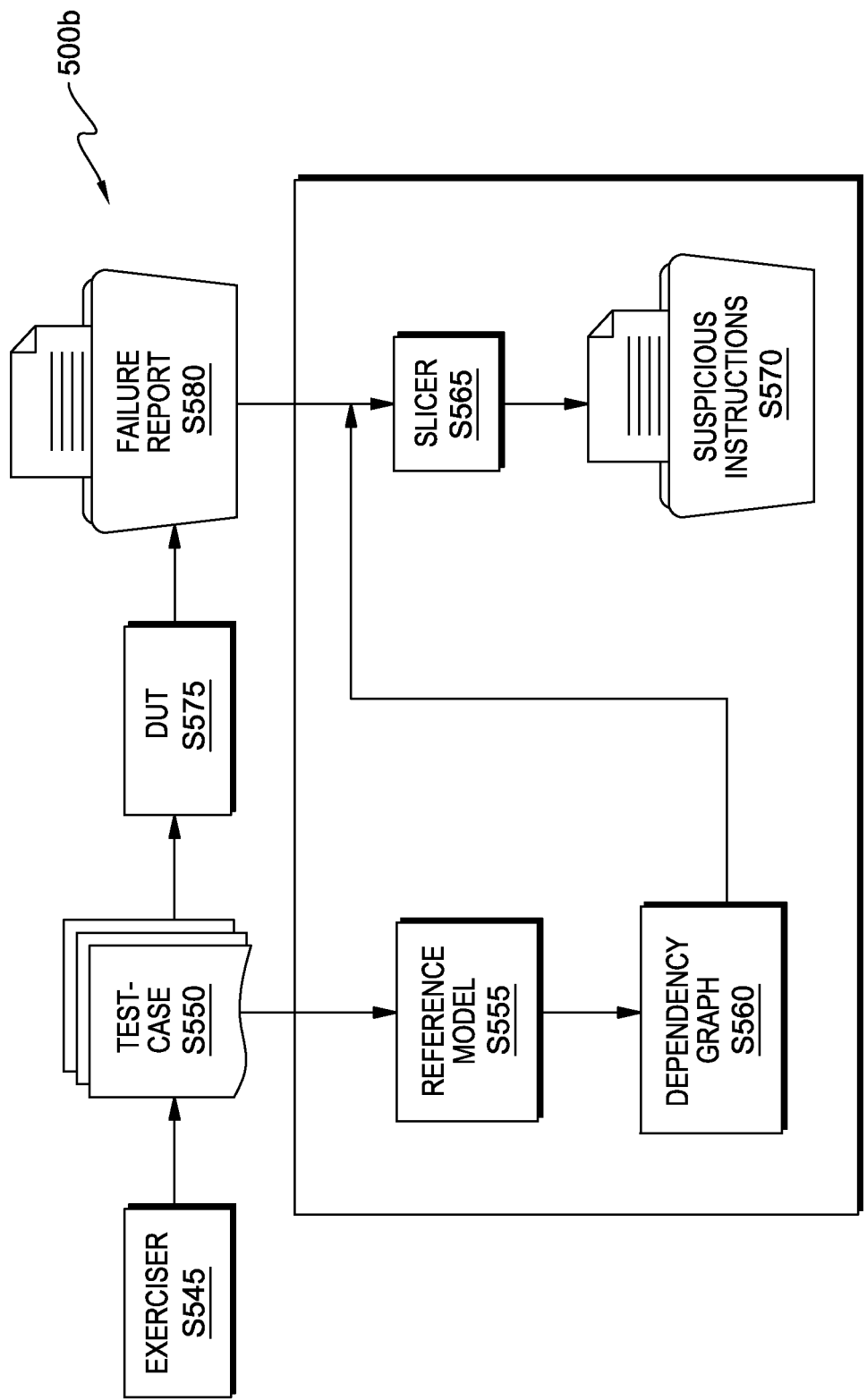
FIG. 5B is another process flow diagram showing a third example method according to the present invention.

Localizing data flow errors involves localizing the faulty instruction in the data flow, which, in some embodiments of the present invention, consists of two major steps. This method is shown in process flow diagram 500b of FIG. 5B. Process flow diagram 500b includes the following steps (process flow among and between these steps is as shown in FIG. 5B): (S545) exerciser generates the testcase; (S550) testcase is stored for later use; (S555) testcase is run on software version of design under test (DUT); (S560) dependency graph is created for the testcase; (S565) dynamic slicer performs dynamic slicing (as will be explained in detail, below); (S570) "suspicious instructions" (this phrase will be further explained below) are identified; (S575) testcase is run on design under test (DUT); and (S580) failure report is generated.

In the first major step, the failing testcase is executed on a software reference model. The reference model is used to collect data dependencies and build a resource dependency graph. The dependency graph is built from the information collected while running the testcase on the reference model (also known as, Instruction Set Simulator, ISS). ISS allows each instruction to execute in order to get various details resulting from this execution, such as: (i) the identity of the inputs and outputs; and/or (ii) results. "Dynamic slicing" is a technique to select a subset, sometimes called slice, from the set of all testcase instructions. Dynamic slicing uses a pre-existing dependency graph.

In the second major step, the knowledge of the miscompared data resources reported by the exerciser is used to analyze this graph, and, consequently, identify a subset of suspicious instructions that includes a faulty instruction. The term "architectural level" describes things that are visible to a program. On the other hand, details that are hidden from the user program are herein referred to as "micro-architectural level." In this context "architectural level failure" is erroneous behavior that can be expressed in terms of wrong instruction execution. The root cause for this erroneous behavior is a problem at the micro-architectural level, which is hidden from a program user.

The dependency graph has an initial state layer holding the initial values of the different resources. Additional layers represent the state after each instruction execution. The edges of the graph represent the dependencies between the resources of two consecutive states (layers). There are two types of dependencies: direct and trivial. If, during the execution of an instruction, resource A was read and resource B was modified, we define B to be directly dependent on A. This type of dependency is depicted by a "regular edge" in the dependency graph. In case no change occurs in a resource's value as a result of the execution of a given instruction of the testcase, a "trivial dependency edge" depicts this type of dependency. More specifically, the trivial dependency edge is located between the two nodes associated with this resource in the relevant consecutive layers of the dependency graph.

Dynamic program slicing means that the testcase is executed on the reference model, and new instructions are derived from a particular execution of the testcase. In the new instructions, loops are eliminated by the unrolling of each loop into a series of instructions per each iteration. Hence, the new instructions (also called the "new testcase representation") are free of loops and its corresponding dependency graph has no backward edges.

The dependency graph is used to do two depth first searches (DFS) as will be respectively discussed in the following two paragraphs. A DFS traverses a graph from the root and explores as far as possible along each branch before backtracking that is going into depth. An alternative is BFS (breadth-first search), which begins at the root node and inspects all the neighboring nodes, which is going into width. Those of skill in the art will be familiar with both DFS and BFS style traversal.

The first depth first search will herein be called the "miscompare DFS" (or the "red DFS"). The red DFS considers each node that might have an influence on the manifested miscompared resources. A node n will be considered in the red DFS if it satisfies two constraints as follows: (i) a path exists from n to a node at the bottom layer that is associated with a miscompared resource; and (ii) the resource of node n has been modified during the execution of the corresponding instruction. The red DFS is done by running DFS (depth first search) backwards starting from each node n at the bottom layer that is associated with a miscompared resource to obtain a "red" set of nodes that might have an influence on the manifested miscompared resources. By considering the red set of nodes obtained by the red DFS, a dynamic program slice is defined to include all the instructions in all layers that contain at least one red node. Each instruction in the dynamic program slice, as defined as described in this paragraph, is a possible candidate for being an erroneous instruction.

After the red DFS, a "non-miscompare DFS" (also called a "green DFS") is performed to further analyze the dependency graph to reduce the size of the dynamic program slice even more. The green DFS potentially removes some of the red nodes, obtained through the red DFS step, in order to potentially reduce the number erroneous instruction candidates. The green DFS is a heuristic that removes an instruction from the erroneous instruction candidates list in case its result propagates to a resource that does not miscompare at the end of the running of the testcase. This heuristic involves running DFS backwards from certain nodes in the bottom layer, where the certain nodes are the nodes that are respectively associated with a resource that does not miscompare. Each node reached by the green DFS traversal is considered as a green node. To the extent that a green node was previously identified as a red node during red DFS, it will no longer be considered as red node. In other words, some of the nodes that were colored red by the first phase are colored green by the second phase DFS traversal. For any node changed from red to green during green DFS, the instruction associated with the changing node is removed from the erroneous instruction candidate list.

One conventional goal of the post-silicon validation effort is to detect, analyze and find the root cause of design functional and electrical bugs, which escaped the pre-silicon verification effort. Despite continuous improvements in pre-silicon verification technologies (that is, debugging technologies based on software simulation and/or emulation of hardware to be later implemented as actual hardware), both formal and simulation-based, the role of functional validation at the post-silicon stage continues to grow. Formal verification uses various techniques to prove that a design is correct. The formal methods are rigorous. However, formal methods can only be effectively applied only to relatively small design blocks. In contrast, simulation-based methods can verify large designs, for example modern processors, but simulation-based methods check only selected points in the huge design space. The practice is to use formal methods where it is possible, and complement them with the simulation-based verification.

The above method and techniques will now be explained in greater depth and detail. The focus is on the third stage of the post-silicon process (see Background section, above), which is localizing the fail. A list of candidates for erroneous instructions in a failing testcase (that is, a testcase whose running results in a miscompare) is: (i) generated as an initial list; and then (ii) automatically narrowed to a narrowed list. In some embodiments, the narrowed list may be automatically narrowed all the way down to identification of a single erroneous instruction. Based on the data gathered in this process (that is, the identity of the erroneous instruction, its location in memory, the operands it accesses, etc.) the design's hardware debug logic can then be configured to trace relevant data, facilitating the "root-causing" of the bug.

Some embodiments of the present disclosure may have one, or more, of the following features, advantages and/or characteristics: (i) use the software reference model (sometime called golden model) as a vehicle to explore fail reasons and obtain observability into the architectural changes triggered by the testcase; (ii) based on a report extracted from the exerciser fail, initialize and re-run the failing testcase on the reference model; (iii) utilize dynamic slicing techniques to determine the list of instructions that affect the miscomparing resources at the end of the reference model's run, based on a resource dependency graph constructed from the data collected during the reference model's run; (iv) use a dependency graph to filter out, from a complete instruction list of a testcase, a small subset of instructions that have a high likelihood of having triggered the miscompare.

The approach that will now be described in detail has been validated through error injection experiments. The results indicate that in 63% of all cases, methods according to the present disclosure were able to single out the problem, that is, correctly point either instruction that was not properly executed by the design. In 33% of all cases, methods according to the present disclosure were able to narrow down the list of suspicious instructions to only 3 instructions out of a 220. In 2% of all cases, methods according to the present disclosure triggered false fails, erroneously pointing at an average of 2.17 instructions. In these cases, the list of instructions affecting the miscomparing resources included an average of 13.86 instructions.

A localization algorithm according to the present disclosure will now be discussed. Post-silicon validation is performed on a design that passed pre-silicon verification, where most hardware bugs are detected, and manufacturing testing, where the silicon was screened for manufacturing defects. Considering that a low proportion (believed to be about 2%) of logic bugs are found at the post-silicon validation stage, it is assumed that a single testcase may hit at most a single bug. Therefore a fail can be localized to a single faulty instruction. The localization algorithm distinguishes between two types of errors: (i) control flow errors; and (ii) data flow errors. Control flow errors occur when the design executes an erroneous path inside the testcase. This may happen, for example, if a branch instruction is taken when it should not. A data flow error occurs when data is corrupted during the execution of an instruction. This occurs when the instruction reads a wrong value from one of its inputs, fails to compute the right output, or writes a wrong value into one of its outputs. The corrupted data may propagate and contaminate other resources along the testcase execution flow.

An algorithm for localizing data flow errors will now be discussed. Localizing the faulty instruction in the data flow consists of two major steps. First, the localization algorithm executes the failing testcase on a software reference model. The localization algorithm uses the reference model to collect data dependencies and build a resource dependency graph. Next, the algorithm uses the identity of the miscompared data resources reported by the exerciser to analyze this graph and, consequently, identify a subset of erroneous instruction candidates, which subset will include the faulty instruction.

To illustrate the localization algorithm's solution scheme, analysis begins with correct execution of a testcase, as shown in Table 1:

|  |  | R0 | R1 | R2 | R3 | R4 |
|---|---|---|---|---|---|---|
|  | Initial state: | 0x0 | 0x1 | 0x2 | 0x3 | 0x4 |
| I1 | R0 ← R1 + R2 | 0x3 | 0x1 | 0x2 | 0x3 | 0x4 |
| I2 | R1 ← R0 + R3 | 0x3 | 0x6 | 0x2 | 0x3 | 0x4 |
| I3 | R2 ← 0x1 | 0x3 | 0x6 | 0x1 | 0x3 | 0x4 |
| I4 | R4 ← R1 + R2 | 0x3 | 0x6 | 0x1 | 0x3 | 0x7 |
|  |  |  |  | Final state |  |  |

The example includes four instructions that use five registers (R0 . . . R4). Executing this testcase with the same initial values should always produce the same end-of-test results. Consider the case in which the execution of I2 has corrupted the data in R1 (corrupted data is represented by asterisked cells in Table 2). Faulty execution of testcase is shown in Table 2:

|  |  | R0 | R1 | R2 | R3 | R4 |
|---|---|---|---|---|---|---|
|  | Initial state: | 0x0 | 0x1 | 0x2 | 0x3 | 0x4 |
| I1 | R0 ← R1 + R2 | 0x3 | 0x1 | 0x2 | 0x3 | 0x4 |
| I2 | R1 ← R0 + R3 | 0x3 | 0x0* | 0x2 | 0x3 | 0x4 |
| I3 | R2 ← 0x1 | 0x3 | 0x0* | 0x1 | 0x3 | 0x4 |
| I4 | R4 ← R1 + R2 | 0x3 | 0x0* | 0x1 | 0x3 | 0x1* |
|  |  |  |  | Final state |  |  |

Figure 7A:
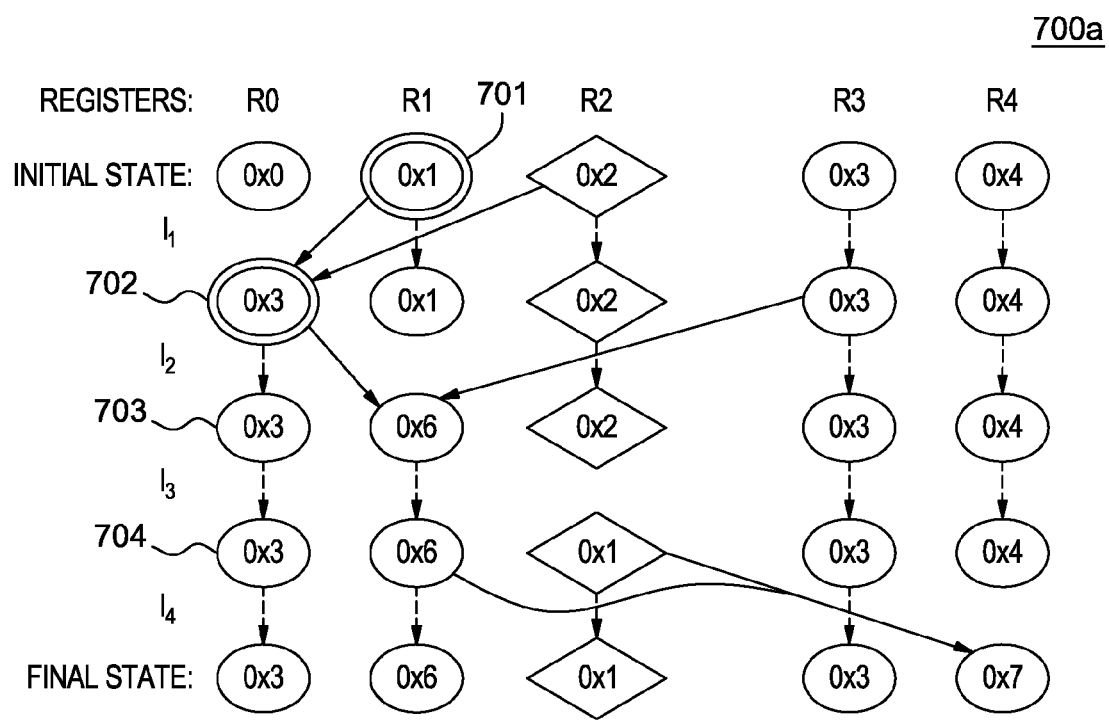
FIGS. 7A, 7B and 7C respectively show three data flow diagrams helpful in explaining the present invention.

The comparison between the end-of-test results of the correct execution in Table 1 and the ones from the faulty execution in Table 2 indicates a miscompare in registers R1 and R4. To localize the faulty instruction, the localization algorithm first builds a resource dependency graph by executing the testcase in Table 1 using the reference model. The corresponding dependency graph 700a is shown in FIG. 7A, with each resource associated with a node that represents its initial value and additional nodes that hold the values computed after each instruction execution. For example, all diamond-shaped nodes in graph 700a are associated with R2. Graph 700a has an initial state layer (that is, row of nodes) holding the initial values of the different resources. Additional layers represent the state after each instruction execution. The arrows in the dependency graph (sometimes herein called edges of the graph) represent the dependencies between the resources of two consecutive states (layers).

There are two types of dependencies: direct and trivial. If, during the execution of an instruction, resource A was read and resource B was modified, B is defined to be directly dependent on A. This type of dependency is depicted by a solid line style arrow. For example, in FIG. 7A, a direct dependency exists between R1 node 701 and R0 node 702 because of usage of register R1 to write register R0 by instruction I1. Nodes 701 and 702 are shown in double-circles. In the case that no change occurs in a resource's value as part of the execution of an instruction, a trivial dependency edge exists between the two nodes associated with this resource in the relevant consecutive layers of the graph. Trivial dependencies are depicted by dotted line style arrows. For example, in diagram 700a, I3 does not modify node 703 as it becomes node 704, and therefore, there is a "trivial dependency edge" shown by a dotted arrow from node 703 to node 704.

As the localization algorithm uses dynamic program slicing (that is, the algorithm executes the testcase on the reference model) the instructions are derived from a particular execution of the testcase. Therefore, loops are eliminated by the unrolling of each loop into a series of instructions per each iteration. Hence, the new testcase representation is free of loops and its corresponding dependency graph has no backward edges (which is to say, no dependency arrows running in a direction from a node at a layer to a node at a previous layer.

Figure 7B:
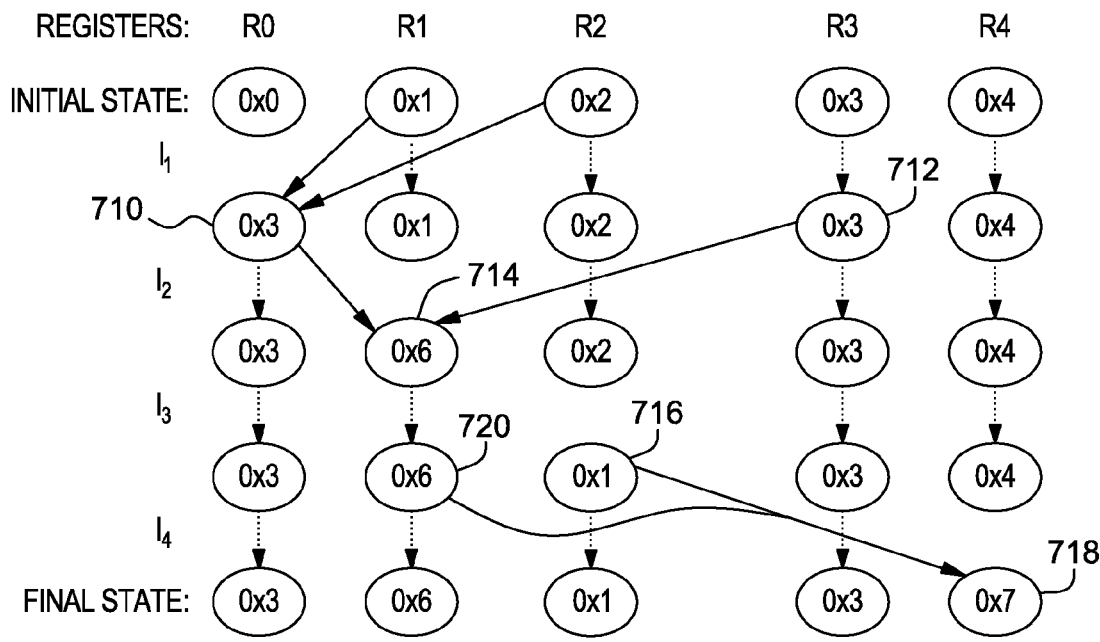

The localization algorithm proceeds to perform a miscompare DFS. As shown in FIG. 7B, dependency graph 700b illustrates the miscompare DFS step. At this miscompare DFS step, nodes 710, 712, 714, 716 and 718 are identified as DFS miscompare nodes. The miscompare DFS nodes are the nodes that might have an influence on the manifested miscompared resources, which, in this example is the final state of register R4. More specifically, a node n will be considered as a miscompare DFS node if it satisfies two constraints as follows: (i) a dependency path exists from node n to the node representing the miscompared resource node of the final state (or node n is the miscompared resource of the final state, see graph 700b at node 718); and (ii) the resource of node n has been modified during the execution of the immediately preceding instruction. In diagram 700b, only nodes 710, 712, 714, 716 and 718 meet the miscompare DFS constraints.

The identification of nodes as miscompare DFS nodes is done by running DFS (Depth First Search) backwards starting from each node at the bottom layer that is associated with a miscompared resource. Note that node 720 meets constraint (i) for being identified as a miscompare DFS node, but it does not meet constraint (ii) because node 720 was not modified in its value by instruction I3 (that is, the immediately preceding instruction with respect to node 720). Using the miscompare DFS nodes of graph 700b, the localization algorithm defines the dynamic program slice (after miscompare DFS analysis, but before non-miscompare DFS analysis) to be all the instructions which immediately precede a layer of the dependency graph that has at least one miscompare DFS node. Accordingly, for graph 700b, the localization algorithm defines the dynamic slice to be instructions I1, I2, I3 and I4. In this simplified example, the miscompare DFS analysis does not really narrow down the dynamic slice because all instructions I1, I2, I3 and I4 are present in the post-miscompare-DFS dynamic slice. However, in other embodiments, miscompare DFS analysis will narrow down the dynamic slice and its concomitant list of erroneous instruction candidates.

Figure 7C:
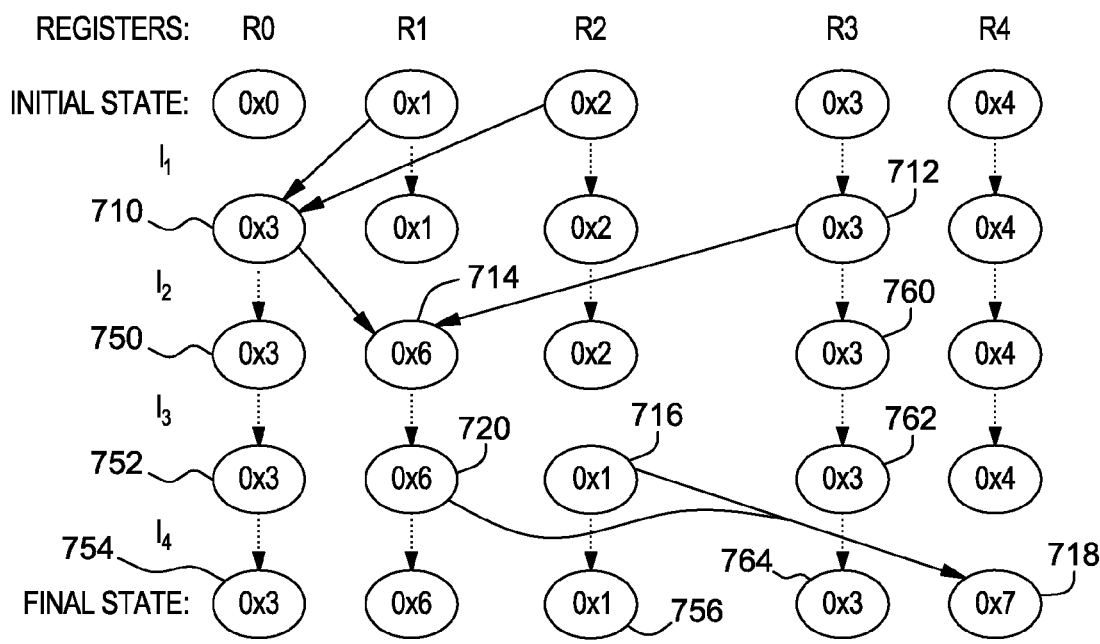

After miscompare DFS analysis, the localization algorithm compares non-miscompare DFS analysis, as shown in dependency graph 700c in FIG. 7C. As will now be explained, after non-miscompare analysis: (i) the miscompare nodes are reduced from nodes 710, 712, 714, 716, 718 down to nodes 714 and 718; and (ii) the dynamic slice (that is, the list of erroneous instruction candidates) is reduced from I1, I2, I3, I4 down to I2 and I4. This relatively small list of erroneous instruction candidates helps in the post-silicon debugging effort, even though it does not necessarily focus attention all the way down to a single node and/or single instruction. This localization of the localization algorithm is believed to be helpful whether further post-silicon debugging (including, hopefully, a fix) is to be performed by people or by automatic debugging software.

In the non-miscompare stage of analysis, a heuristic is employed such that an instruction will be removed from the dynamic slice (that is, the list of erroneous instruction candidates) in case the results of that instruction propagates to a resource which does not miscompare at the end of the running of the testcase. This heuristic is implemented by running DFS backwards from each node in the bottom layer (see FIG. 7C at the "FINAL STATE" row) that has not miscompared. In this example, the non-miscompared nodes in the bottom layer are as follows: 754, 756 and 764. Then, when applying the heuristic by running DFS backwards in a process sometimes herein referred to as "DFS traversal," it is determined that nodes 710, 712, 750, 760, 752, 716 and 762 are also non-miscompare nodes (along with nodes 754, 756 and 764). It is noted that some of the nodes that were previously determined as miscompare nodes during the earlier miscompare DFS analysis are now determined to be non-miscompare nodes. More specifically, in the example of FIGS. 7B and 7C, nodes 710, 712 and 716 are changed in status from miscompare nodes to non-miscompare nodes by the non-miscompare stage of analysis. In FIG. 7C, after DFS traversal of the non-miscompare stage of analysis, the remaining miscompare nodes (that were identified as miscompare nodes at the miscompare stage and not changed in their status at the non-miscompare stage) are, therefore, nodes 714 and 718.

Now that the miscompare nodes have been narrowed down to nodes 714 and 718, the dynamic slice is also narrowed down accordingly. Instruction I2 is the instruction that gives node 714 its miscompare value. Instruction I4 is the instruction that gives node 718 its miscompare value. Therefore, instructions I2 and I4 are the only instructions remaining in the dynamic slice after the non-miscompare stage of analysis.

Some formal definitions will now be discussed. The term "resource" is used herein to describe a single register or an addressable memory location, and it may be denoted by "$d_i$". Given a machine A (that is, the DUT) with a set of resources $D=\{d_0, d_1, \ldots, d_{|D|-1}\}$ (its registers and memory) and a series of instructions $K=(I_1, I_2, \ldots, I_{|K|})$ (the testcase) we define the resource dependency graph $G=(V, E)$ such that:

$$V=\{n_{ij}: i\in(0 \ldots |K|), j\in(0 \ldots |D|-1)\}$$

V is partitioned into $|K|+1$ layers: an initial state layer and $|K|$ additional layers that represent the state of the different resources after the execution of each instruction:

$$\forall_i\in(0 \ldots |K|): L_i=\{n_{ij}: j\in(0 \ldots |D|-1)\}$$

$L_0$ is the initial state layer and $L_i$ is the layer associated with instruction i.

To define the graph edges, the software reference model, denoted by ALRM (for Architectural Level Reference Model), is used. The ALRM is initialized with the state described by $L_0$. Next, the ALRM serially executes the instructions $I_1, \ldots I_{|K|}$. After each executed instruction, the ALRM holds two sets of data resources: resources that were accessed by $I_i$ for read which is denoted by $R_i \subset D$, and resources that were modified by $I_i$ which are denoted by $W_i \subset D$. Given these two subsets, the direct dependency edges are defined as follows:

$$E_i=\{n_{i-1,j}\twoheadrightarrow n_{i,k}: d_j\in R_i, d_k\in W_i\}$$

and the trivial dependency edges as follows:

$$\bar{E}_i=\{n_{i-1,j}\to n_{i,j}: d_j\notin W_i\}$$

Note that in these definitions and algorithms, a direct dependency edge is denoted by "$\twoheadrightarrow$" and a trivial dependency edge is denoted by "$\to$". The edges of the graph are then defined by:

$E$=the union of the following sub-sets for $i$ values 1 to $K:(E_i \cup \bar{E}_i)$ Algorithm 1 describes the generation the dependency graph. Note that a node $n_{ij}$

---

Algorithm 1 Graph generation

```
1:  Input: K = (I₁, ..., I_|K|), D = {d₀, ..., d_|D|-1}, ALRM
2:  i ← 1
3:  ALRM.Initialize( )
4:  Graph G ← φ                                        ▷ G = (V, E)
5:  V ← {n_{0,j} : j ∈ (0...|D| − 1)}
6:  for all I ∈ K do
7:      ALRM.performInstruction(I)
8:      V ← {n_{i,j} : j ∈ (0...|D| − 1)}
9:      R_i ← ALRM.R_I
10:     W_i ← ALRM.W_I
11:     E_i ← φ, Ẽ_i ← φ
12:     for all d_j ∈ R_i, d_k ∈ W_i do
13:         E_i ← {n_{i-1,j} → n_{i,k}}              ▷ direct dependencies
14:     end for
15:     for all d_j ∈ D \ W_i do
16:         Ẽ_i ← {υ_{i-1,j} → υ_{i,j}}              ▷ trivial dependencies
17:     end for
18:     E ← E_i ∪ Ẽ_i
19:     i ← i + 1
20: end for
``` may either be a target of a direct dependency edge, or a trivial dependency one, but not both.

---

Algorithm 2 Graph coloring, phase 1 - red coloring

---

```
1:  Input: G = (V, E), M = {d_{i1}, ...d_{i|M|}}, |K|     ▷M ⊂ D
2:  procedure RED_COLORING( G, M, |K| )
3:      for all d_j ∈ M do
4:          DFS_RED(G, |K|, j)
5:      end for
6:  end procedure
7:
8:  procedure DFS_RED(G, i, j)
9:      B ← φ
10:     if i ≠ 0 then
11:         if ∃n_{i-1,j} → n_{i,j} ∈ E then
12:             DFS_RED(G, i -1, j)
13:         else
14:             n_{i,j}.color ← RED
15:             B ← {n_{i-1,t} : ∃n_{i-1,t} → n_{i,j} ∈ E}
16:             for all n_{i-1,t} ∈ B do
17:                 DFS_RED(G, i - 1, t);
18:             end for
19:         end if
20:     end if
21: end procedure
```

---

Let $M \subset D$ be a subset of resources that trigger a miscompare following the multi-pass execution of the testcase. The dependency graph and M are the inputs for the miscompare analysis algorithm described, above, in connection with FIG. 7B, and set forth, below, in Algorithm 2.

Finally, the non-miscompare analysis algorithm (described, above, in connection with FIG. 7C) is performed according to Algorithm 3 set forth below.

---

Algorithm 3 Graph coloring, phase 2 - green coloring

---

```
1:  Input: G = (V, E), M = {d_{i1}, ...d_{i|M|}}, |K|, D
2:  procedure GREEN_COLORING( G, M, |K| )
3:      for all d_j ∈ D \ M do
4:          DFS_GREEN(G, |K|, j)
5:      end for
6:  end procedure
7:
8:  procedure DFS_GREEN(G, i, j)
9:      B ← φ
10:     If i ≠ 0 then
11:         n_{i,j}.color ← GREEN
12:         B ← {n_{i-1,t} : ∃n_{i-1,t} → n_{i,j} ∈ E}
13:         B ← {n_{i-1,j} : ∃n_{i-1,j} → n_{i,j} ∈ E}
14:         for all n_{i-1,t} ∈ B do
15:             DFS_GREEN(G, i - 1, t);
16:         end for
17:     end if
18: end procedure
```

---

Recall that we partition the nodes into $|K|+1$ disjoint layers, a node $n_{i,j}$ is in layer i. The reduced program slice P is defined as the set of instructions for which their associated layers contain one or more miscompare nodes remaining after non-miscompare analysis. Namely:

$$P = \{I_i : I_i \in K, \exists n_{i,j} \in L_i, n_{i,j}.color = RED \text{ (the color associated with miscompare)}\}$$

P, here, is the list of erroneous instruction candidates.

The effectiveness of this method was evaluated by injection of a random error into a testcase generated by a multi-pass consistency checking exerciser. The exerciser generated and ran testcases with 220 random instructions. The testcases were executed on a reference model. In this experiment, the exercisers was repeatedly executed on the reference model and allowed to generate different random testcases. For each testcase, various scenarios were created by selecting one instruction and altering its result. This repeatedly caused the exerciser to stop and report the miscompared resources. The reports were then passed to the method described above for analysis.

The experiment generated a total of 271 scenarios with a manifested miscompare. The experimental results are set forth in Table 3 as follows:

| localized? (reduced slice size) | Number of scenerios | Program slice average size | Reduced slice average size |
|---|---|---|---|
| yes (1) | 172 | 7.29 | 1 |
| yes (>1) | 91 | 9.34 | 3.00 |
| no (0) | 1 | 19.00 | 0 |
| no (>0) | 7 | 13.86 | 2.71 |

In all 271 cases the dynamic program slice, resulting from the execution of Algorithm 2, included the corrupted instruction. This is attributed to the correct modeling of the architectural data propagation by the reference model. The data flow heuristic accurately localized the suspicious instructions list to the single corrupted instruction in 172 scenarios. In 91 scenarios the reduced instruction list contained, on average, 3 instructions, including the corrupted one. This means that roughly 98% of the instructions in the testcase were successfully acquitted of faulty behavior.

In 1 scenario the final reduced instruction list ended up empty. In this case the size of the dynamic program slice before the non-miscompare phase was 19 instructions, including the faulty instruction. Finally, in 7 scenarios the suspicious instruction list was not empty, yet the faulty instruction was not contained in it. In such cases the average reduced list included 2.17 instructions.

A simple example how the faulty instruction may be removed by the non-miscompare phase is when a division instruction is executed, the denominator is corrupted (and not 0), and the numerator is 0. In this case the result of the instruction is 0 as expected, even though the data used is corrupted. In such case there is no indication that the instruction used a corrupted resource, and Algorithm 3 will continue to acquit the preceding instructions (including the faulty one).

In summary, out of a total of 621 scenarios, in 476 scenarios (76.6%) the method described herein provides exact localization. In additional 101 scenarios (16.2%) the method returns a sub-set of instructions that contains the faulty instruction, and the subset is a little less than 5% of the entire testcase in average (the subset being either the reduced list after the green coloring, or the dynamic slice before the green coloring in the case where the reduced list after the green coloring is empty). Ultimately, in 44 scenarios (7%) the reduced list provides an erroneous indication, that is, it does not contain the faulty instruction.

Another example of a localization algorithm according to the present disclosure will now be discussed with reference to diagrams 800a to 800d of FIGS. 8A to 8D, respectively.

Data flow errors occur when data is corrupted during one of the instruction execution phases. Some examples of data flow errors are: instruction reading a wrong value from one of its inputs, instruction failing to compute the right output, or instruction writing a wrong value into one of its outputs. The faulty data may propagate and contaminate other resources along the testcase execution flow.

As shown in diagram 800a of FIG. 8A, testcase includes five instructions (I1 . . . I5) that use four registers (R0 . . .

R3) and one memory location at address 0xB. When this testcase runs on a bug-free processor, with the initial state of 0, C, A, F, E (see "Initial state row" of diagram 800s), then a bug-free processor will always produce the correct final state of 3, C, 0, B, 8 (see "Correct Final state" row of diagram 800a). Assume that I2 erroneously writes 13 to R2 during the testcase executions. In this example, this error will cause the wrong value of 13 to be written in memory at address 0xB (see "Corrupted Final state" row of diagram 800a), and this error will show up in the final state of testcase run. In diagram 800a, the corrupted block is shown as cross-hatched. After running the same testcase on ISS, the correct final state will be obtained. At that stage, the memory resource 0xB will be identified as faulty based on the comparison of final states of original testcase run on hardware (HW) and the ISS run. A tool according to the present disclosure analyzes a failing testcase, while leveraging the information derived from comparison of HW and ISS runs, in order to identify a set of instructions, or at least narrow down the possible instructions, that may have lead to the faulty final state shown in diagram 800a. This identification, or narrowing, of possibly faulty instructions is called "localization."

In this example, failure localization consists of three major steps as follows: (i) a resource dependency graph is built based on execution of the testcase on the ISS; (ii) a dynamic program slice of instructions that influences the faulty resources is created; and (iii) the slice is reduced by removing instructions that contributed to correct resources.

Figure 8B:
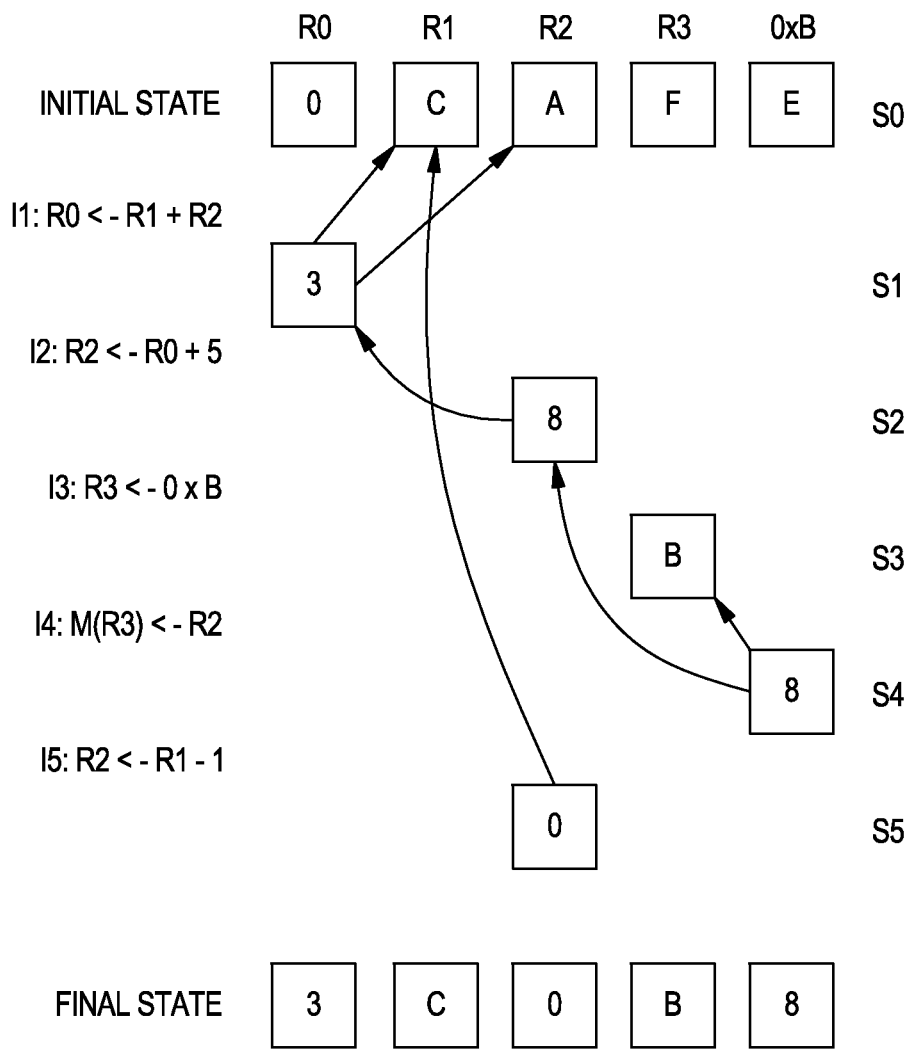

As shown in diagram 800b of FIG. 8B, a resource dependency graph is built by running the testcase of diagram 800a on the ISS. As further shown in FIG. 800b, nodes in the graph are grouped in layers where each layer represents a consistent machine state. The first layer represents an initial state, S0, and the last layer represent the "Final state." Execution of each instruction moves a processor to the next state. For the sake of clarity, at intermediate states diagram 800b shows only the resources that were modified by the related instruction. For example, execution of I2 moves the machine from S1 to S2.

Resource B is dependent on resource A if there is an instruction I with input A and output B. Resource dependencies are represented as edges between resources at two consecutive states of the resource dependency graph. For example, R2 depends on R0 due to their usage by I2. The dependency graph is built based on the testcase execution. This eliminates any loops initially present in a testcase by unrolling the loops into a series of instructions per iteration. For this reason, the dependency graph will not contain any loops because of the method by which it is constructed.

Figure 8C:
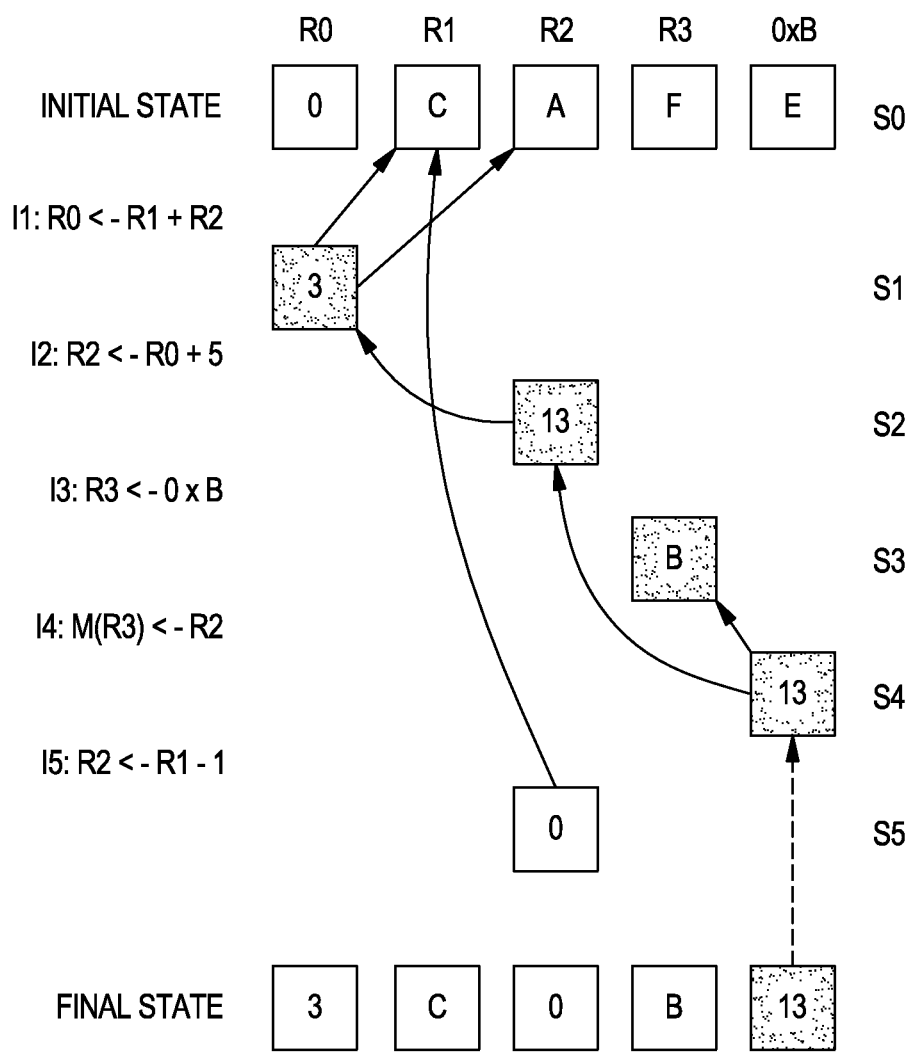

As shown by diagram 800c of FIG. 8C, in the second stage, a program slice of instructions is created that affect the faulty resources. To build a program slice, the dependency graph is traversed using a Depth First Search (DFS) starting from each faulty resource node at the final state (bottom layer, labeled "Final State" in diagram 800c). During the traversal we mark all the visited nodes at the intermediate states, as suspicious. A program slice is a set of all instructions that have at least one output resource marked as suspicious. Diagram 800c shows such a graph traversal, with: (i) the suspicious blocks marked by cross-hatching; and (ii) the associated instructions set forth to the left of the diagram as I1 to I5. The traversal starts at the final state of memory located at address 0xB. All marked nodes are shown in with cross-hatching. The corresponding program slice consists of I1, I2, I3, I4. As can be seen, the faulty instruction I2 is indeed included in the set of suspicious instructions of this initial dynamic slice. Note, however, that all listed instructions I1 to I5, inclusive, are suspected of being erroneous in this initial dynamic slice of diagram 800c. Still the DFS leading to this initial dynamic program slice shown, by example, in diagram 800c can still substantially reduce the search space as compared to an initial testcase.

Figure 8D:
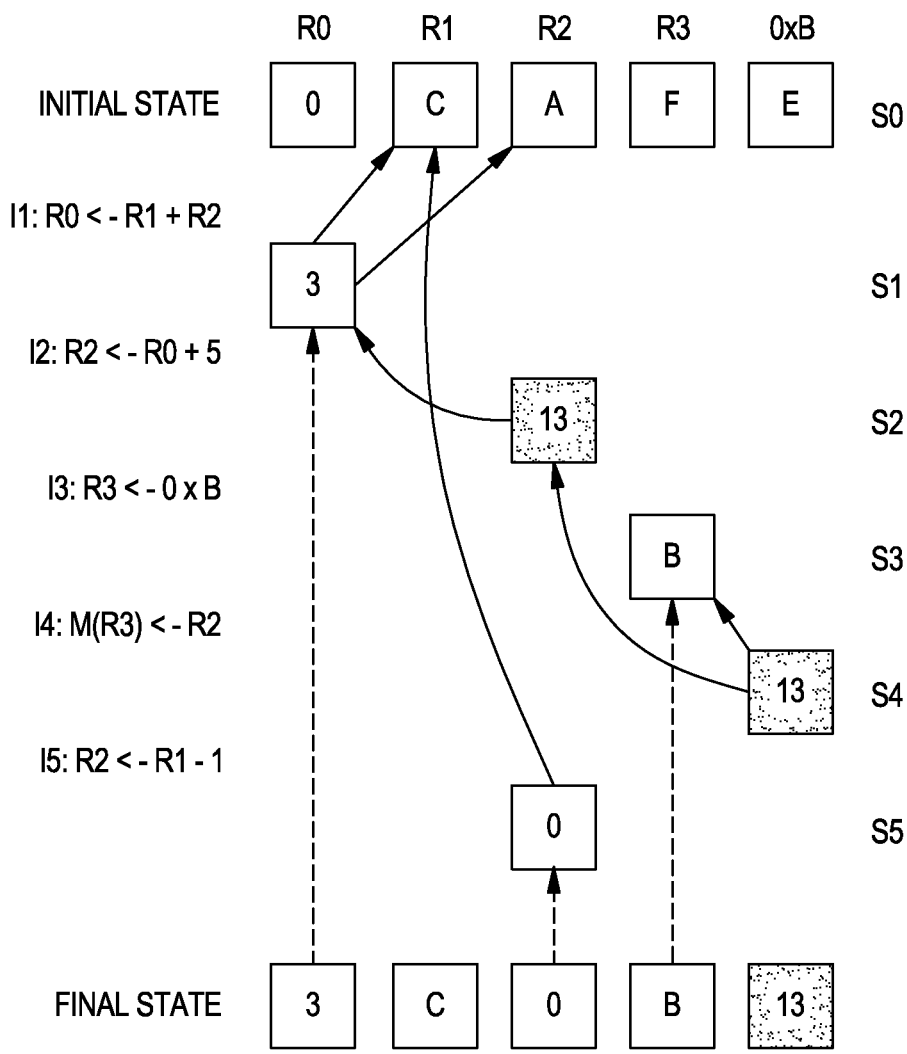

As shown by diagram 800d of FIG. 8D, in the third stage, a justification heuristic is employed to further reduce the set of suspicious instructions. Under this justification heuristic, an instruction will be removed from the suspicious set any of its result(s) that do not miscompare. This justification heuristic runs a DFS from each resource that has a correct result at the final state (see diagram 800d at the row labeled "Final state"). Each node reached by the DFS traversal of a correct final result is marked. This marking is shown by removal of the cross-hatching from the node traversed in the DFS of each correct result (compare diagram 800c with diagram 800d). If the resource(s) whose value(s) follow from a given instruction from the initial slice are all marked (that is, cross-hatch removed), then that instruction is removed from the suspicious instructions list.

As shown in diagram 800d: (i) the only resource associated with I1 has been marked (that is, had its cross-hatching removed); (ii) the only resource associated with I3 has been marked (that is, had its cross-hatching removed); and (iii) the only resource associated with I5 has been marked (that is, had its cross-hatching removed). For these reasons, I1, I3 and I5 are removed from the suspicious instructions list by the justification heuristic in this example. After application of the justification heuristic, the suspicious instructions set contain only I2 and I4. The rest of the previously suspected instructions are cleared by the justification traversal from the correct resources R0, R2, R3. Note that the faulty instruction I2 is still in the final suspicious list, even though it has not been identified by the only possibility in this example method. Still, narrowing down the suspicious instruction list to I2 and I4 is potentially greatly helpful.

The previous algorithms discussed above deal with localizing data flow errors. A different type of algorithm will now be discussed in the following paragraphs, specifically a localization algorithm dealing with localizing control flow errors. In this algorithm, using a novel heuristic, incorrect execution paths are evaluated in an attempt to provide an accurate justification to the end-of-test erroneous results. The data flow and control flow algorithms disclosed herein may be practiced separately, or together.

The "control flow embodiments" disclosed herein may include one, or more, of the following features, characteristics and/or advantages: (i) a method that enables an accurate justification of the wrong end-of-test results in cases of a single control flow error; (ii) using a reference model to traverse, one at a time, wrong testcase execution paths to try to reach the exact wrong end-of-test results; and/or (iii) use a heuristic that enables an accurate justification of the wrong end-of-test results in cases of a single control flow error.

A control flow embodiment will now be discussed in detail with reference to process flow diagram 500a shown in FIG. 5A. Process flow diagram 500a includes the following steps (process flow among and between these steps is as shown in FIG. 5A): (S505) exerciser generates the testcase; (S510) testcase is stored for later use; (S515) testcase is run on software version of design under test (DUT); (S520) "wrong paths" (this term will be further explained below) are identified; (S525) failure "justification" (this term will be further explained below) determined; (S530) failed branch identified; (S535) testcase is run on design under test (DUT); and (S540) failure report is generated.

To explain further, these control flow embodiments execute the testcase's wrong paths, one at a time, in an attempt to reproduce the erroneous results of the testcase. This is accomplished by running the testcase B+1 times, where B is the number of branches in the correct path. First, the correct path is executed to determine the correct end-of-test results. Next, the testcase is run repeatedly, in a manner so that in each iteration a different branch is selected and the reference model is forced to continue execution on its wrong path. In case a wrong path execution (herein sometimes called the "current path") ends with the exact results as collected by the exerciser during the failing run, then it is determined that the error was indeed due to the execution of the current path.

Figure 6:
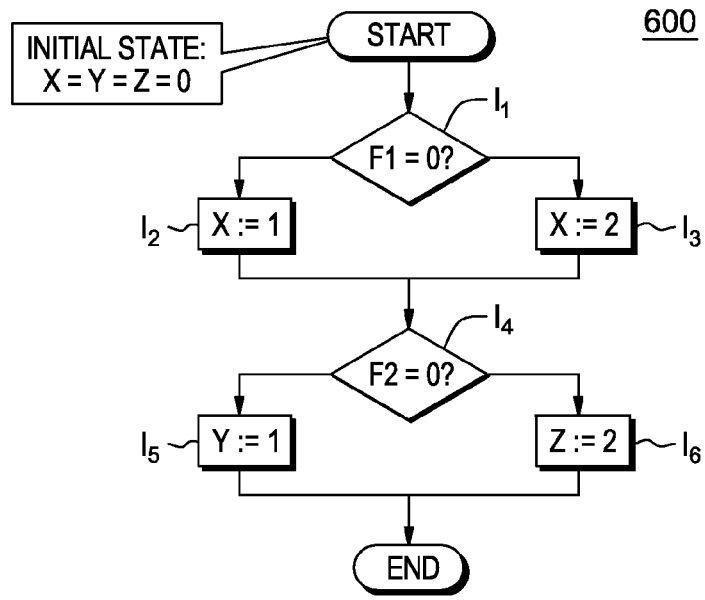
FIG. 6 is a flow chart showing a fourth example method according to the present invention.

Executing a testcase on the reference model cannot provide details on changes to resources on bad execution paths. This is because the reference model always executes the correct path. FIG. 6 shows diagram of possible process flows 600, including possible steps I1, I2, I3, I4, I5 and I6. Assume the correct execution path is: (i) step I1; then (ii) step I2; then (iii) step I4; then (iv) step I5. Running this path results in X=1, Y=1 and Z=0, as shown in diagram 600. Consider a case where branching step I1 is faulty. In this case, I3 is executed instead of I2 and the end-of-test results are X=2, Y=1 and Z=0, triggering a miscompare on X. Based only on the correct execution path (as when executing a testcase on a reference model) one would suspect I2 to be faulty, as this is the only instruction that writes to location X.

A different problem may occur if branching step I4 is faulty. In this case, writing step I6 will execute instead of writing step I5, and, accordingly, the end-of-test results are X=1, Y=0 and Z=2, thereby resulting in a miscompare on locations Y and Z. Because no instruction on the correct path writes any value to location Z, the reference model cannot assist in providing insights on the origin of the fail.

The portion of the localization algorithm dealing with localizing control flow errors executes the testcase's incorrect paths, one at a time, in an attempt to reproduce the erroneous results of the testcase observed in post-silicon phase testing on the actual DUT hardware. The algorithm accomplishes this by running the testcase B+1 times, where B is the number of branches in the correct path. First, the localization algorithm executes the correct path in the reference model to determine the correct end-of-test results. Next, the localization algorithm repeatedly runs the testcase on the reference model, where, in each iteration, the localization algorithm selects a different branch and forces the reference model to continue execution on its incorrect path. For example, returning attention to diagram 600 of FIG. 6, assuming the correct execution order as {I1, I2, I4, I5}, this heuristic portion of the localization algorithm would next execute {I1, I3, I4, I5}, and, then {I1, I2, I4, I6}. In case one of these two incorrect path executions ends with the exact incorrect results as collected by the exerciser during the running of the failing testcase, the localization algorithm would conclude that the error was indeed due to the execution of that particular incorrect path. In the general case, the number of incorrect-path executions is exponential in the number of branches. However, as the DUT is expected to be fairly stable at the post-silicon stage, the localization algorithm assumes that there is only a single control flow error and therefore end up with a linear number of incorrect-path executions.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Software storage device: any device (or set of devices) capable of storing computer code in a manner less transient than a signal in transit; "software storage device" does not include: any device that stores computer code only as a signal.

Tangible medium software storage device: any software storage device (see Definition, above) that stores the computer code in and/or on a tangible medium.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method for helping to localize an error observed by running a testcase made up of instructions that write to a set of data storage locations, the method comprising:
    running the testcase on a software model version of a processor to yield first testcase-run results in the form of a first set of values respectively stored in the set of data storage locations, with the software model version of the processor being run on first host processor hardware;
    running the testcase on a hardware version of the processor to yield second testcase-run results in the form of a second set of values respectively stored in the set of data storage locations, with the hardware version of the processor including second host processor hardware;
    creating a resource dependency information set including information regarding how data in various storage locations is dependent upon data in other data storage locations when the testcase is run;
    determining a set of miscompare data storage location(s), including at least a first miscompare data storage location, by comparing the first set of values and the second set of values; and
    creating an initial dynamic slice of the instructions of the testcase based upon: (i) the set of miscompare data storage location(s), and (ii) the resource dependency information set.

2. The method of claim 1 further comprising:
    recording data flow in the set of data storage locations during the running of the testcase on the software model version of the processor.

3. The method of claim 1 wherein the software model version of the processor uses Instruction Set Simulation.

4. The method of claim 1 wherein the creation of the initial dynamic slice eliminates instructions of the testcase not associated with the miscompare data storage location(s) in the resource dependency information set.

5. The method of claim 1 further comprising:
reducing the initial dynamic slice to yield a first reduced dynamic slice by:
selecting a first non-miscompare data storage location that is not a miscompare data storage location, and
eliminating, based upon the resource dependency information set, all instructions in the initial dynamic slice upon which the first non-miscompare data storage is dependent.

6. The method of claim 5 further comprising:
further reducing the first reduced dynamic slice to yield a second reduced dynamic slice by:
selecting a second non-miscompare data storage location that is not a miscompare data storage location, and
eliminating, based upon the resource dependency information set, at least some instructions in the initial dynamic slice upon which the second non-miscompare data storage is dependent.

7. The method of claim 6 further comprising:
writing a most reduced dynamic slice in at least one of the following ways: (i) human readable form, and/or (ii) machine readable form.

8. A computer program product for helping to localize an error observed by running a testcase made up of instructions that write to a set of data storage locations, the computer program product comprising a software storage device implemented in hardware and software stored on the software storage device, the software comprising:
first program instructions programmed to run the testcase on a software model version of a processor to yield first testcase-run results in the form of a first set of values respectively stored in a set of data storage locations;
second program instructions programmed to run the testcase on a hardware version of the processor to yield second testcase-run results in the form of a second set of values respectively stored in a set of data storage locations;
third program instructions programmed to create a resource dependency information set including information regarding how data in various storage locations is dependent upon data in other data storage locations when the testcase is run;
fourth program instructions programmed to determine a set of miscompare data storage location(s), including at least a first miscompare data storage location, by comparing the first set of values and the second set of values; and
fifth program instructions programmed to create an initial dynamic slice of the instructions of the testcase based upon: (i) the set of miscompare data storage location(s), and (ii) the resource dependency information set.

9. The product of claim 8 wherein the software further comprises:
sixth program instructions programmed to record data flow in the set of data storage locations during the running of the testcase on the software model version of the processor.

10. The product of claim 8 wherein the software model version of the processor uses Instruction Set Simulation.

11. The product of claim 8 wherein the fifth program instructions are further programmed to eliminate instructions of the testcase not associated with the miscompare data storage location(s) in the resource dependency information set.

12. The product of claim 8 wherein the software further comprises:
sixth program instructions programmed to reduce the initial dynamic slice to yield a first reduced dynamic slice by: (i) select a first non-miscompare data storage location that is not a miscompare data storage location, and (i) eliminate, based upon the resource dependency information set, at least some instructions in the initial dynamic slice upon which the first non-miscompare data storage is dependent.

13. The product of claim 12 wherein the software further comprises:
seventh program instructions programmed to further reduce the first reduced dynamic slice to yield a second reduced dynamic slice by: (i) select a second non-miscompare data storage location that is not a miscompare data storage location, and (ii) eliminate, based upon the resource dependency information set, all instructions in the initial dynamic slice upon which the second non-miscompare data storage is dependent.

14. The product of claim 13 wherein the software further comprises:
eighth program instructions programmed to write a most reduced dynamic slice in at least one of the following ways: (i) human readable form, and/or (ii) machine readable form.

15. A computer system for helping to localize an error observed by running a testcase made up of instructions that write to a set of data storage locations, the computer system comprising:
a processor(s) set; and
a software storage device;
wherein:
the processor set is structured, located, connected and/or programmed to run software stored on the software storage device; and
the software comprises:
first program instructions programmed to run the testcase on a hardware version of the processor to yield second testcase-run results in the form of a second set of values respectively stored in a set of data storage locations;
second program instructions programmed to run the testcase on a software model version of a processor to yield first testcase-run results in the form of a first set of values respectively stored in a set of data storage locations;
third program instructions programmed to create a resource dependency information set including information regarding how data in various storage locations is dependent upon data in other data storage locations when the testcase is run;
fourth program instructions programmed to determine a set of miscompare data storage location(s), including at least a first miscompare data storage location, by comparing the first set of values and the second set of values; and
fifth program instructions programmed to create an initial dynamic slice of the instructions of the testcase based upon: (i) the set of miscompare data storage location(s), and (ii) the resource dependency information set.

16. The system of claim 15 wherein the software further comprises:
sixth program instructions programmed to record data flow in the set of data storage locations during the running of the testcase on the software model version of the processor.

17. The system of claim 15 wherein the software model version of the processor uses Instruction Set Simulation.

18. The system of claim 15 wherein the fifth program instructions are further programmed to eliminate instructions of the testcase not associated with the miscompare data storage location(s) in the resource dependency information set.

19. The system of claim 15 wherein the software further comprises:
- sixth program instructions programmed to reduce the initial dynamic slice to yield a first reduced dynamic slice by: (i) select a first non-miscompare data storage location that is not a miscompare data storage location, and (i) eliminate, based upon the resource dependency information set, at least some instructions in the initial dynamic slice upon which the first non-miscompare data storage is dependent.

20. The system of claim 19 wherein the software further comprises:
- seventh program instructions programmed to further reduce the first reduced dynamic slice to yield a second reduced dynamic slice by: (i) select a second non-miscompare data storage location that is not a miscompare data storage location, and (ii) eliminate, based upon the resource dependency information set, all instructions in the initial dynamic slice upon which the second non-miscompare data storage is dependent.

* * * * *